UNITED STATES PATENT OFFICE.

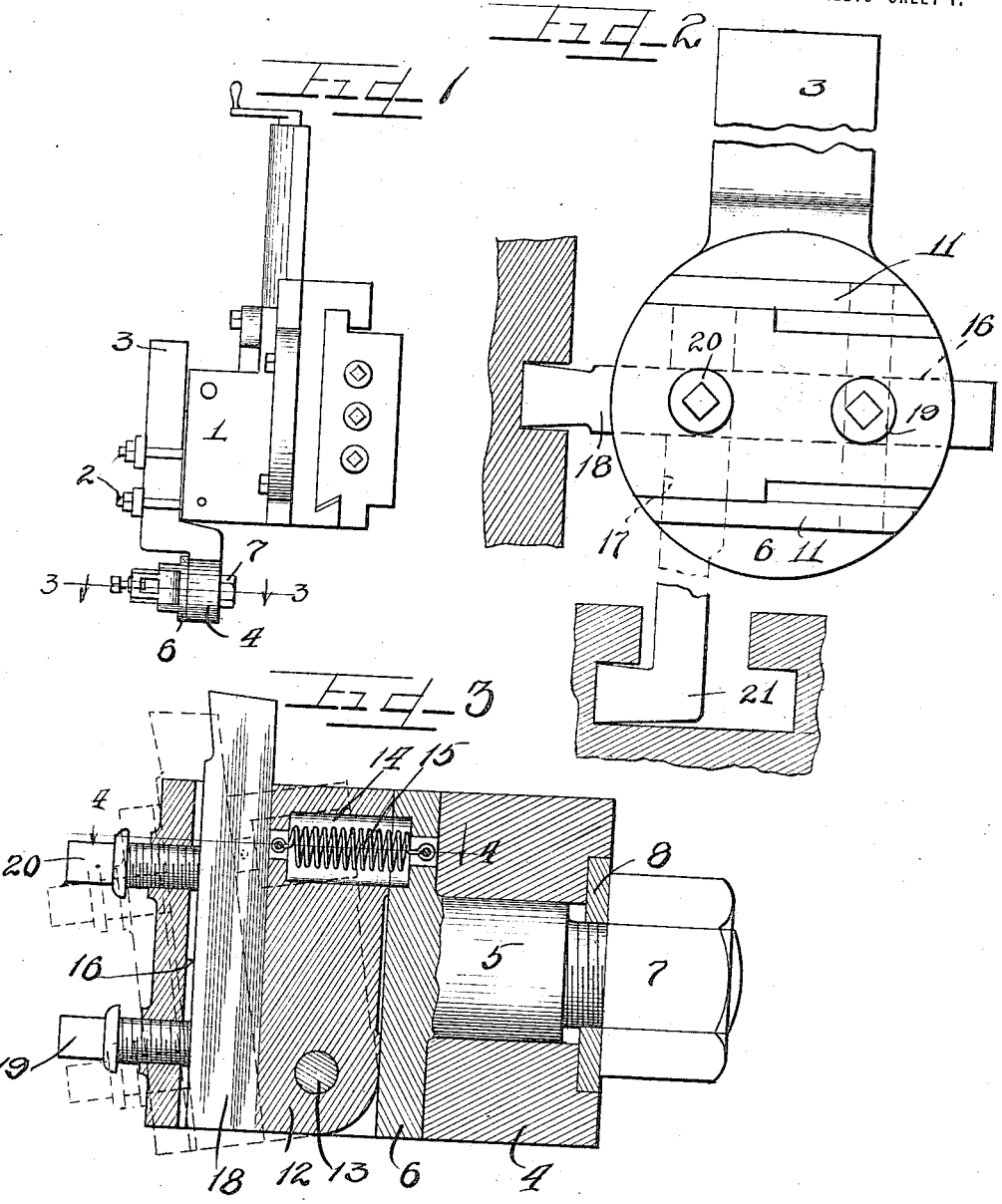

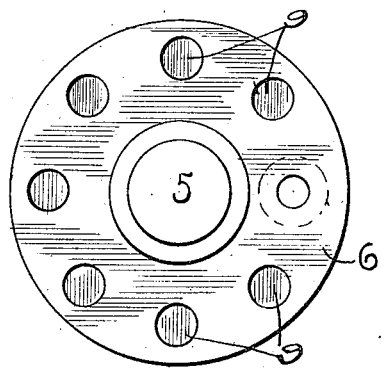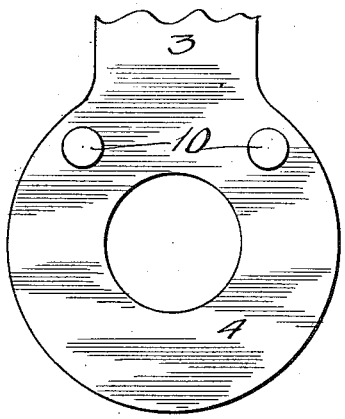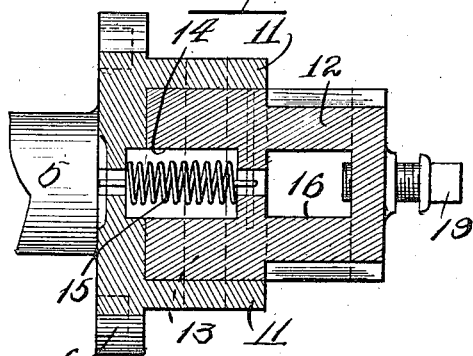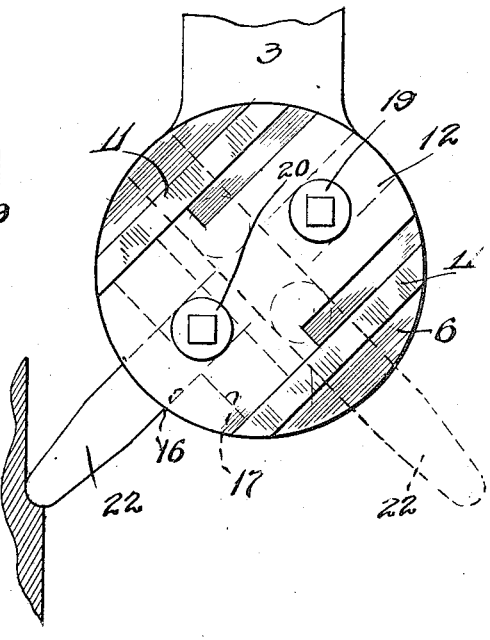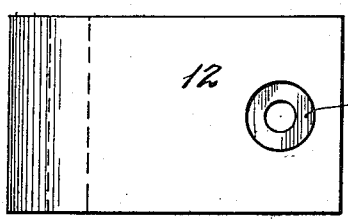

ENGELBERTUS KLEINEGRIS, OF CHICAGO, ILLINOIS.

TOOL-HOLDER.

1,266,486. Specification of Letters Patent. Patented May 14, 1918.

Application filed February 1, 1917. Serial No. 145,935.

*To all whom it may concern:*

Be it known that I, ENGELBERTUS KLEINEGRIS, a citizen of the United States, and a resident of the city of Chicago, in the county of Cook and State of Illinois, have invented certain new and useful Improvements in Tool-Holders; and I do hereby declare that the following is a full, clear, and exact description of the same, reference being had to the accompanying drawings, and to the numerals of reference marked thereon, which form a part of this specification.

One difficulty experienced in the use of planing machines provided with adjustable tool holders is the wearing down of the tool edge preceding a new cut, inasmuch as the tool rides upon the edge of the cut last made as the work is moved past the tool back toward initial position. Some types of tool holders have been designed which permit a retractive movement of the tool so that the heel of the cutting tool rides upon the work in its retractive or backward movement on the machine, and the tool then falls into proper cutting position after the work then has moved therepast. Such tool holders have not, however, been sufficiently adjustable to permit use of the tool for the many different kinds of cuts required.

This invention relates to a rotatably adjustable tool holder which permits the tool to be placed in any position for almost any kind of cut, and in all its positions is retractable to a certain extent upon a pivot forming a part thereof so that the tool edge is not forced against the work during retractive movement of the work to thus wear away the cutting edge of the tool.

It is an object therefore of this invention to construct an adjustable tool holder wherein the carrying member for the tool is pivotally mounted upon a tool holder bracket permitting bodily adjustments of the entire tool holder to properly position the tool, and as well permitting secondary adjustments of the tool holder and tool within the holder, and with the tool holder pivotally mounted in all positions of adjustment whereby a retractive movement thereof in a direction opposite to that of a cut made, is permitted.

It is also an object of this invention to construct a rotatably adjustable tool holder mounted upon a carrier member and with the tool holder pivotally mounted to permit retractive movements thereof to permit the heel of the cutting tool to ride upon the work during a backward movement of the work preliminary to a cutting operation.

It is furthermore an object of this invention to provide an adjustable tool holder comprising a rotatable head adapted to interlock in different adjusted positions with the stationary head, and with a pivotal tool carrying block upon said rotatable head, which permits a retractive movement of the tool during a reverse movement of the work or tool, whichever is moved, to prevent wearing down of the cutting edge of the tool by contact with the work.

Other and further important objects of the invention will be evident from the disclosure in the specification and drawings.

The invention (in a preferred form) is illustrated in the drawings and hereinafter more fully described.

On the drawings:

Figure 1 is a reduced side elevation of a conventional type of tool carrier mechanism equipped with a tool holder embodying the principles of my invention.

Fig. 2 is an enlarged face view of the tool holder showing the possible adjustments thereof for use with different types of tools.

Fig. 3 is a sectional detail on line 3—3 of Fig. 1, with parts omitted and parts in elevation.

Fig. 4 is a fragmentary detail section taken on line 4—4 of Fig. 3.

Fig. 5 is an end view of the mechanism shown in Fig. 4.

Fig. 6 is a fragmentary similar face view of the complemental stationary head member of the tool holder.

Fig. 7 is a view similar to Fig. 2, illustrating a possible adjustment of the tool holder.

Fig. 8 is an elevational view of the inner or back surface of the pivoted clamping block of the tool holder shown in Fig. 3.

As shown on the drawings:

The reference numeral 1, indicates as a whole a tool carrier forming a part of a planing machine, and secured adjustably thereon by means of bolts 2, is a long upright shank portion 3, of one element of the tool holder which has formed at its lower offset end a stationary head 4. Said head 4, is axially cored out, and engaged therethrough is the stud extension 5, of a rotatable head or disk 6, and the outer threaded end of said shank 5, extending beyond said head 4, is provided with a nut 7, which bears downwardly upon a washer 8, seated in a recessed portion of the head 4. The face of said disk or head 6, adjacent to the head 4, is provided with a series of apertures or holes 9, arranged equi-distantly at angles of 45° apart, and secured rigidly upon or formed upon the adjacent surface of the stationary head 4, are a pair of pins 10, arranged 90° apart, and adapted to engage with two of said apertures 9, whereby said respective heads 4 and 6, are locked in stationary relation.

Formed upon the opposite surface of said rotatable disk or head 6, are parallel ribs or guide flanges 11, and fitted therebetween is a pivoted clamping block 12. Said pivoted clamping block is held engaged between said ribs or flanges 11, by a pintle 13, engaged through one end thereof and through said ribs or flanges 11. At its upper end, said block is cored out or provided with a recess 14, and engaged therein is a tension spring 15, which is also engaged in a cored out recess provided in the adjacent face of the rotatable disk or head 6, so that the pivoted clamping block is held normally in close contact with the head 6.

The outer end of said pivoted clamping block 12, is provided with rectangular apertures 16 and 17, arranged therethrough at right angles to one another, as shown clearly in Figs. 2 and 7, adapted to receive a cutting tool 18, engaged through either one thereof. Said clamping block is provided with two clamping bolts to hold a tool in place, one of said bolts denoted by the reference numeral 19, adapted to hold a tool engaged in the rectangular tool hole 16, and the other bolt, denoted by the reference numeral 20, and adapted to hold the tool engaged in either of the rectangular tool holes. The fragmentary broken away portion at the lower part of Fig. 2, illustrates the possible use of a tool 21, in the tool hole 17, and one of different shape from the tool 18. In this instance the tool 21, is mounted in the tool hole 17, so that the same pivotal action on the pivot 13, is obtained as in the case of the tool 18, due to the fact that the tool 21, is a side cutting tool, shown in the present instance, as cutting a T-groove. The tool 22, shown in Fig. 7, is a reversible tool for either right or left hand work, and may be mounted in place through either one of the tool holes 16 or 17, or, as shown, a readjustment of the head 6, may be made.

The operation is a follows:

A tool may be engaged in either one of the tool holes 16 or 17, and suitably clamped rigidly therein by respective bolts 19 or 20, as the case may be. The clamping block 12, in which the tool holes are provided to receive the tool is pivotally mounted at one of its ends upon the adjustable or rotatable head 6, and a tool is so mounted that the pivot 13, for the clamping block is disposed substantially at right angles to a normal line through the cutting edge of the tool. Thus when the work is retracted after a cut has been taken, the tool riding upon the work will swing upon its pivot to cause the heel of the tool to contact the work and the cutting edge will not be worn away. Due to the fact that the tool may be mounted in either one of two right angle positions in the clamping block 12, it is obvious that a tool may be so disposed that the pivot for the clamping block is always properly disposed to permit a retractive pivotal movement of the clamping block during reverse movements of the tool or work intermediate a cutting operation. Also, due to the fact that the entire head or block 6, is rotatable upon the stationary head 4, it is obvious that a tool may be properly positioned to secure the desired cut, and inasmuch as the pivot 13, is mounted in said adjustable head 6, it is always properly positioned to permit an easy retractive pivotal movement of the tool clamping block when occasion requires. Due to the number of apertures 9, provided for engagement with the stationary pins 10, it will be seen that the clamping head 6, on which the tool is carried is susceptible of a number of adjustments.

The spring 15, connected within the pivoted clamping block 12, always operates to normally maintain the same in position for a cutting operation by the tool. When a retractive movement of the work is made, preliminary to another cut, the tool rides out into the dotted line position shown in Fig. 3, so that the heel of the tool bears against the work, and the cutting edge is protected, and upon moving away from the work at the end of the retractive movement, the spring 15, pulls the tool holder and tool back into cutting position such as shown in full lines.

I am aware that various details of construction may be varied through a wide range without departing from the principles of this invention, and I therefore do not purpose limiting the patent granted otherwise than necessitated by the appended claims.

I claim is my invention:

1. A tool holder comprising a stationary head, outwardly projecting pins secured thereto, a rotatable head provided with a central stud and apertures arranged concentrically around the stud to receive said pins therein, a tool holder block pivoted to the rotatable head, said block and rotatable head being recessed, and a spring in said recess adapted normally to hold the block in the rotatable head.

2. A tool holder comprising a stationary head, a rotatable head, interfitting pins and recesses for relative adjustment of said heads, means rigidly securing the heads together, flanges integral with the rotatable head, a tool block pivoted between the flanges, and a pulling spring secured in a recess in the block and connected to the block at one end and to the rotatable head at its opposite end.

In testimony whereof I have hereunto subscribed my name in the presence of two subscribing witnesses.

ENGELBERTUS KLEINEGRIS.

Witnesses:
CHARLES W. HILLS, Jr.,
EARL M. HARDINE.